(12) United States Patent
Rawlins et al.

(10) Patent No.: US 8,811,423 B2
(45) Date of Patent: Aug. 19, 2014

(54) EDGE-BASED PER-FLOW QOS ADMISSION CONTROL IN A DATA NETWORK

(75) Inventors: Diana Rawlins, Richardson, TX (US); Lei Yao, Great Falls, VA (US); David E. McDysan, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 330 days.

(21) Appl. No.: 12/855,930

(22) Filed: Aug. 13, 2010

(65) Prior Publication Data

US 2010/0302943 A1 Dec. 2, 2010

Related U.S. Application Data

(63) Continuation of application No. 10/095,956, filed on Mar. 12, 2002, now Pat. No. 7,796,608.

(60) Provisional application No. 60/331,217, filed on Nov. 13, 2001, provisional application No. 60/276,953, filed on Mar. 20, 2001, provisional application No. 60/276,955, filed on Mar. 20, 2001, provisional application No. 60/276,923, filed on Mar. 20, 2001.

(51) Int. Cl.
*H04J 3/16* (2006.01)

(52) U.S. Cl.
USPC ...... 370/468; 370/230.1; 370/235; 370/395.4

(58) Field of Classification Search
USPC ............ 370/230, 230.1, 468, 235, 390, 395.4
See application file for complete search history.

(56) References Cited

U.S. PATENT DOCUMENTS

| | | | |
|---|---|---|---|
| 5,634,012 A | 5/1997 | Stefik et al. |
| 5,825,772 A | 10/1998 | Dobbins et al. |
| 5,903,735 A | 5/1999 | Kidder et al. |
| 5,960,416 A | 9/1999 | Block |
| 5,991,292 A | 11/1999 | Focsaneanu et al. |
| 6,058,113 A | 5/2000 | Chang |
| 6,073,160 A | 6/2000 | Grantham et al. |
| 6,097,722 A | 8/2000 | Graham et al. |

(Continued)

FOREIGN PATENT DOCUMENTS

CN WO-00/30295 5/2000

OTHER PUBLICATIONS

Balmer, et al., "A Concept for RSVP Over DiffServ," Ninth International Conference on Computer Communications and Networks. pp. 412- 417, Oct. 16-18, 2000.

(Continued)

*Primary Examiner* — Chandrahas Patel

(57) ABSTRACT

In one embodiment of the invention, a network system includes a boundary router, a second router, and an upstream link of the second router coupled between to the output port of the boundary router and an input port of the second router. The second router includes an admission control function and a data plane. In response to a request to reserve resources for a flow through the second router, the admission control function performs admission control for both the upstream link and its downstream link. In a preferred embodiment, the second router performs admission control for the upstream link only if the second router is a receiving edge router for the flow. Because the second router performs admission control for its upstream link, the boundary router transmits the request toward an upstream router without performing admission control for the link.

20 Claims, 10 Drawing Sheets

Unidirectional Traffic Flow

(56) References Cited

U.S. PATENT DOCUMENTS

| | | | |
|---|---|---|---|
| 6,108,314 | A | 8/2000 | Jones et al. |
| 6,137,777 | A | 10/2000 | Vaid et al. |
| 6,141,686 | A | 10/2000 | Jackowski et al. |
| 6,195,355 | B1 | 2/2001 | Demizu |
| 6,539,431 | B1 | 3/2003 | Sitaraman et al. |
| 6,678,264 | B1 | 1/2004 | Gibson |
| 6,708,034 | B1 * | 3/2004 | Sen et al. ............... 455/445 |
| 6,829,221 | B1 * | 12/2004 | Winckles et al. ......... 370/238 |
| 6,917,617 | B2 | 7/2005 | Jin et al. |
| 2001/0025310 | A1 | 9/2001 | Krishnamurthy et al. |
| 2001/0027490 | A1 | 10/2001 | Fodor et al. |
| 2001/0048682 | A1 | 12/2001 | Fichou et al. |

OTHER PUBLICATIONS

Bernet, et al., "A Framework for Integrated Services Operation Over Diffsery Networks—RFC 2998," Network Working Group, The Internet Society, 29 pages, Nov. 2000.

Bernet, at al., "The Complementary Roles of RSVP and Differentiated Services in the Full-Service QoS Network," IEEE Communications Magazine, vol. 38, Issue 2, pp. 154-162, Feb. 2000.

Boyle, at al., "The COPS (Common Open Policy Service) Protocol, draft-ietf-rap-cops07-txt," Internet Engineering Task Force (IETF), pp. 1-33, Aug. 16, 1999.

Detti, et al., "Supporting RSVP in Differentiated Service Domain: An Architectural Framework and a Scalability Analysis," IEEE International Conference on Communications (ICC '99), vol. 1, pp. 204-210, Jun. 6-10, 1999.

Ekstein, et al., "AAA Protocols: Comparison between RADIUS, DIAMETER and COPS, draft-ekstein-roamops-protcomp-00.txt," ROAMOPS Working Group, Internet Engineering Task Force (IETF), p. 1-17, Aug. 1999.

Eriksson, et al., "SIP Telephony Gateway on DTM," The Royal Institute of Technology Sweden, Bachelors Thesis, pp. 1-54, Jul. 2, 1999.

Handley, et al., "SIP: Session Initiation Protocol, RFC 2543," Network Working Group, The Internet Society, 131 pages, Mar. 1999.

Hubaux, et al., "The Impact of the Internet on Telecommunication Architectures," Computer Networks and ISDN Systems, vol. 31, No. 3, pp. 257-273, Apr. 11, 1999.

Hussmann, et al, "An Edge Device for Supporting Internet Integrated Services Over Switched ATM Networks," Interoperable Communication Networks, vol. 1, No. 9, pp. 321-330, Sep. 1998.

Kausar, et al., "A Charging Model for Sessions on the Internet," Proceedings of the Fourth IEEE Symposium on Computers and Communications, pp. 32-38, Apr. 1999.

Kumar, et al., "Beyond Best Effort: Router Architectures for the Differentiated Services of Tomorrow's Internet," IEEE Communications Magazine, pp. 152-164, May 1998.

Mamais, et al. "Efficient Buffer Management and Scheduling in a Combined IntServ and DiffServ Architecture: A Performance Study," 2nd International Conference on ATM (ICATM '99), pp. 236-242, Jun. 21-23, 1999.

Neilson, et al., "A Discussion of Bandwidth Broker Requirements for Internet2 Qbone Deployment, Version 0.7," Internet2 Qbone BB Advisory Council, pp. 1-30, Aug. 1999.

Nichols, et al. "A Two-bit Differentiated Architecture for the Internet, RFC 2638," Network Working Group, pp. 1-25, Jul. 1999.

Pan, et al., "Diameter: Policy and Accounting Extension for SIP, draftpan-diameter-sip-01.txt," Internet Engineering Task Force, Internet Draft. 25 pages, Nov. 15, 1998.

Pan, et al. "DIAMETER: Policy and Accounting Extension for SIP (draft-pan-diameter-sip-01)," Internet Engineering Task Force (IETF), The Internet Society, 20 pages, Nov. 15, 1998.

Schulzrinne, et al. "Interaction of Call Setup and Resource Reservation Protocols in Internet Telephony," pp. 1-13, Jun. 11, 1999.

Sinnreich, et al. "AAA Usage for IP Telephony with QoS, draft-sinnreich-aaa-interdomain-sip-qos-osp-00,txt," Internet Engineering Task Force (IETF), 20 pages, Jul. 2000.

Sinnreich, et al. "Interdomain IP Communications with QoS, Authorization and Usage Reporting, draft-sinnreich-sip-qos-osp-01.txt," Internet Engineering Task Force (IETF), 51 pages, Feb. 2000.

Terzis, et al. "A Prototype Implementation of the Two-Tier Architecture for Differentiated Services," UCLA Computer Science Department, http://irl.cs.ucla.edu/papers/rtas99-final.pdf, eight pages, Jun. 16, 1999.

Wright, et al. "P 'Telephony' vs. ATM: What is There to Discuss?," 1st IEEE International Conference on ATM (ICATM-98), pp. 400-409, Jun. 22-24, 1998.

* cited by examiner

EDGE-BASED PER-FLOW QOS ADMISSION CONTROL IN A DATA NETWORK

CROSS REFERENCE TO RELATED CASES

This application is a continuation of application Ser. No. 10/095,956, filed Mar. 12, 2002, and claims priority under 35 U.S.C. §120 to the following applications, which are assigned to the assignee of the present invention and incorporated herein by reference in their entireties:
  (1) U.S. Patent Application Ser. No. 60/276,923, filed Mar. 20, 2001, and entitled "IP Communications;"
  (2) U.S. Patent Application Ser. No. 60/276,953, filed Mar. 20, 2001, and entitled "IP Communications;"
  (3) U.S. Patent Application Ser. No. 60/276,955, filed Mar. 20, 2001, and entitled "IP Communications;" and
  (4) U.S. Patent Application Ser. No. 60/331,217, filed Nov. 13, 2001, and entitled "Differentiated Services Model with Explicit Policy and Admission Control for QoS of IP Flows."

The present application is related to the following applications, which are assigned to the assignee of the present invention and incorporated herein by reference in their entireties:
  (1) U.S. patent application Ser. No. 10/023,331, filed Dec. 17, 2001, now U.S. Pat. No. 6,778,498 issued Aug. 17, 2004, and entitled "Virtual Private Network (VPN)-Aware Customer Premises Equipment (CPE) Edge Router;"
  (2) U.S. patent application Ser. No. 10/095,910, filed Mar. 12, 2002, now U.S. Pat. No. 7,209,439 issued Apr. 24, 2007, and entitled "Pool-Based Resource Management in a Data Network;"
  (3) U.S. patent application Ser. No. 10/095,909, filed Mar. 12, 2002, now U.S. Pat. No. 7,069,337 issued Jun. 27, 2006, and entitled "Policy-Based Synchronization of Per-Class Resources Between Routers in a Data Network."
  (4) U.S. patent application Ser. No. 10/023,043, filed Dec. 17, 2001, and entitled "System, Method, and Apparatus that Employ Virtual Private Networks to Resist IP QoS Denial of Service Attacks;" and
  (5) U.S. patent application Ser. No. 10/667,278, filed Dec. 17, 2001, and entitled "System, Method, and Apparatus that Isolate Virtual Private Network (VPN) and Best Effort Traffic to Resist Denial of Service Attacks."

The following publications available through the Internet Engineering Task Force (IETF) are also incorporated by reference in their entireties as background information:
  (1) Branden, R., Clark D. and S. Shenker, "Integrated Services in the Internet Architecture: an Overview," RFC 1633, June 1994;
  (2) Branden, R., Zhang, L., Berson, S., Herzog, S. and S. Jamin, "Resource ReSerVation Protocol (RSVP)—Version 1 Functional Specification," RFC 2205, September 1997;
  (3) Blake, S., Black, D. Carlson, M., Davies, E., Wang, Z. and W. Weiss, "An Architecture for Differentiated Services," RFC 2475, December 1998;
  (4) Rosen, E. and Y. Rekhter, "BGP/MPLS VPNs," RFC 2547, March 1999;
  (5) Gleeson, B., Lin, A., Heinanen, J., Finland, T., Armitage, G. and A. Malis, "A Framework for IP Based Virtual Private Networks," RFC 2764, February 2000;
  (6) Daniele, M., Haberman, B., Routhier, S. and J. Schoenwaelder, "Textual Conventions for Internet Network Addresses," RFC 2851, June 2000; and
  (7) Bernet, Y., Ford, P., Yavatkar, R., Baker, F., Zhang, L., Speer, M., Braden, R., Davie, B., Wroclawski, J. and E. Felstaine, "A Framework for Integrated Services Operation over Diffserv Networks," RFC 2998, November 2000.

BACKGROUND OF THE INVENTION

1. Technical Field

The present invention relates to communication networks and, in particular, providing an enhanced quality of service (QoS) to selected traffic flows within a network.

2. Description of the Related Art

For network service providers, a key consideration in network design and management is the appropriate allocation of access capacity and network resources between traffic originating from network service customers and traffic originating from outside the service provider's network (e.g., from the Internet). This consideration is particularly significant with respect to the traffic of network customers whose subscription includes a Service Level Agreement (SLA) requiring the network service provider to provide a minimum communication bandwidth or to guarantee a particular Quality of Service (QoS) for certain flows. Such service offerings require the network service provider to implement a network architecture and protocol that achieve a specified QoS and that enforce admission control to ensure sufficient access capacity and network resources are available for customers.

In Internet Protocol (IP) networks, a straightforward approach to achieving QoS and implementing admission control comparable to that of connection-oriented network services, such as voice or Asynchronous Transfer Mode (ATM), is to emulate the same hop-by-hop switching paradigm of signaling resource reservations for the flow of IP packets requiring QoS. In fact, the IP signaling standard developed by the Internet Engineering Task Force (IETF) for Integrated Services (Intserv or IS) adopts precisely this approach. As described in IETF RFC 1633, Intserv is a per-flow IP QoS architecture that enables applications to choose among multiple, controlled levels of delivery service for their data packets. To support this capability, Intserv permits an application at a transmitter of a packet flow to use the well-known Resource ReSerVation Protocol (RSVP) defined by IETF RFC 2205 to initiate a flow that receives enhanced QoS from network elements along the path to a receiver of the packet flow.

RSVP is a QoS signaling protocol on the control plane of network devices that is utilized to request resources for a simplex flows (i.e., RSVP requests resources for a unidirectional flow). RSVP does not have routing functions, but is instead designed to operate with unicast and multicast routing protocols to ensure QoS for those packets that are forwarded in accordance with routing (i.e., RSVP consults the forwarding table (as populated by routing) in order to decide the downstream interface on which policy and admission control for QoS are applied).

FIG. 1 is a block diagram of an Intserv nodal processing model that utilizes RSVP to achieve QoS in accordance with RFC 2205. As illustrated, a transmitting host 100 executes an application 104, which transmits data (e.g., video distribution or voice-over-IP (VoIP)) that requires a higher QoS than the "best effort" QoS generally accorded Internet traffic. Between transmitting host 100 and a receiving host 118 are coupled one or more additional nodes, such as router 102, which implements a routing process 116.

In the control plane, each network node includes an RSVP process 106 that supports inter-node communication of RSVP messages, a policy control block 108 that determines if a user has administrative permission to make a resource reservation for an enhanced QoS flow, and an admission control block 110 that determines whether or not the node has sufficient outgoing bandwidth to supply the requested QoS. In the data plane, each node further includes a packet classifier 112, which identifies packets of a flow and determines the QoS class for each packet, and a packet scheduler 114, which actually achieves the QoS required for each flow in accordance with the packet classification performed by packet classifier 112.

To initiate an RSVP session, application 104 transmits a PATH message, which is sequentially passed to the RSVP process 106 at each node between transmitting host 100 and receiving host 118. Although transmitting host 100 initiates the RSVP session, receiving host 118 is responsible for requesting a specified QoS for the session by sending a RESV message containing a QoS request to each network node along the reverse path between receiving host 118 and transmitting host 100. In response to the receipt of the RESV message, each RSVP process 106 passes the reservation request to its local policy control module 108 and admission control block 110. As noted above, policy control block 108 determines whether the user has administrative permission to make the reservation, and admission control block 110 determines whether the node has sufficient available resources (i.e., downstream link bandwidth) to supply the requested QoS. If both checks succeed at all nodes between transmitting host 100 and receiving host 118, each RSVP process 106 sets parameters in the local packet classifier 112 and packet scheduler 114 to obtain the desired QoS, and RSVP process 106 at transmitting host 100 notifies application 104 that the requested QoS has been granted. If, on the other hand, either check fails at any node in the path, RSVP process 106 at transmitting host 100 returns an error notification to the application 104.

Although conceptually very simple, Intserv QoS provisioning has limited scalability because of the computationally intensive RSVP processing that is required at each network node. In particular, RSVP requires per-flow RSVP signaling, per-flow classification, per-flow policing/shaping, per-flow resource management, and the periodic refreshing of the soft state information per flow. Consequently, the processing required by Intserv RSVP signaling is comparable to that of telephone or ATM signaling and requires a high performance (i.e., expensive) processor component within each IP router to handle the extensive processing required by such signaling.

In recognition of the scalability and other problems associated with implementing IP QoS utilizing conventional Intserv RSVP signaling, the IETF promulgated the Differentiated Services (Diffserv or DS) protocol defined in RFC 2475. Diffserv is an IP QoS architecture that achieves scalability by conveying an aggregate traffic classification within a DS field (e.g., the IPv4 Type of Service (TOS) byte or IPv6 traffic class byte) of each IP-layer packet header. The first six bits of the DS field encode a Diffserv Code Point (DSCP) that requests a specific class of service or Per Hop Behavior (PHB) for the packet at each node along its path within a Diffserv domain.

In a Diffserv domain, network resources are allocated to packet flows in accordance with service provisioning policies, which govern DSCP marking and traffic conditioning upon entry to the Diffserv domain and traffic forwarding within the Diffserv domain. The marking and conditioning operations need be implemented only at Diffserv network boundaries. Thus, rather than requiring end-to-end signaling between the transmitter and receiver to establish a flow having a specified QoS, Diffserv enables an ingress boundary router to provide the QoS to aggregated flows simply by examining and/or marking each IP packet's header.

As described in RFC 2998 and as illustrated in FIG. 2, Integrated Services can be implemented over a Differentiated Services domain. In the network model illustrated in FIG. 2, edge routers (ERs) 120, 128 connect Integrated Services-aware customer LANs (not shown) to boundary routers (BRs) 122, 126 of a Diffserv network 124. To reflect a unidirectional traffic flow from LAN-TX (transmitting) to LAN-RX (receiving), edge router 120 and boundary router 122 are labeled ER-TX and BR-TX, respectively, at the transmitter or ingress side, and edge router 128 and boundary router 126 are labeled ER-RX and BR-RX, respectively, at the receiver or egress side.

Viewed logically, each of routers 120, 122, 126 and 128 has control and data planes, which are respectively depicted in the upper and lower halves of each router. The data plane includes all of the conventional hardware components in the forwarding path of the router (e.g., interface cards and switching fabric), and the control plane includes control hardware (e.g., a control processor) and control software (e.g., routing, signaling and protocol stacks) that support and direct the operation of the data plane.

In the data plane, packets are marked by data plane 120*b* of ER-TX 120 with the appropriate DSCP (e.g., based upon the Intserv 5-tuple of source address, destination address, protocol id, source port and destination port) and forwarded to Diffserv network 124. The packets are then solely Diffserv forwarded across Diffserv network 124 to data plane 128*b* of ER-RX 128. In the control plane, each of edge routers 120, 128 and boundary routers 122, 126 has a control plane that performs Intserv (IS) processing by reference to policies implemented in policy decision points (PDPs) 130*a*, 130*b*. In ER-TX 120, control plane 120*a* performs Intserv per-flow classification and per-flow policing. In boundary routers 122 and 126, the Intserv interfaces facing edge routers 120, 128 manage RSVP signaling, perform Intserv policy and admission control functions, and maintain per-flow state with path state blocks and reservation state blocks. Control plane 128*a* of ER-RX 128 performs Intserv per-flow shaping before outgoing packets are forwarded to LAN-RX.

As discussed above, before sending a traffic flow, a transmitting host in LAN-TX initiates a RSVP PATH message. When the receiving host in LAN-RX receives the PATH message, the receiving host returns a RESV message along the reverse data path to request reservation of resources to provide the desired QoS. After receiving the RESV message, each intermediate router having an Intserv control plane performs admission control for only its downstream link. Thus, ER-RX 128 performs admission control for LAN-RX, BR-RX 126 performs admission control for the link between itself and ER-RX 128, BR-TX 122 performs admission control for the path across Diffserv network 124 to BR-RX 126, and ER-TX 120 performs admission control for the link between itself and BR-TX 122. The RSVP admission control process verifies resource availability on each link and accordingly adjusts the remaining resource count for the link.

Although Intserv per-flow admission control is performed on the control plane, the actual delivery of QoS for a traffic flow is accomplished on the data plane. ER-TX 120 performs Intserv operations (i.e., per-flow classification, per-flow policing, and per-flow DSCP marking) on data packets received at its Intserv input interface (IS IN). At the Diffserv output interface (DS OUT) of ER-TX 120, data packets are identified and class-based queued based on only their DSCP values. BR-TX 122 then performs per-class policing for each customer at its input interface (DS IN) and class-based queuing at its output interface (DS OUT). At BR-RX 126, no operation is performed at the input interface (DS IN), and class-based queuing and optionally per-class shaping are performed for each customer port at the output interface. ER-RX 128 forwards packets received at its input interface (DS IN) and may perform per-flow scheduling or shaping at its Intserv output interface (IS OUT).

Although the Diffserv standard improves upon Intserv's scalability by replacing Intserv's processing-intensive signaling in the Diffserv domain with a simple class-based processing, implementation of the Diffserv protocol introduces a different problem. In particular, because Diffserv allows host marking of the service class, a Diffserv network customer link (e.g., the outgoing link of BR-RX 126) can experience a Denial of Service (DoS) attack if a number of hosts send packets to that link with the DS field set to a high priority, as discussed in detail in application Ser. No. 10/023,331 cross-referenced above.

Furthermore, despite some improvements in scalability within the Diffserv domain, Intserv admission control utilizing RSVP still requires per-flow state installation, per-flow state refreshment, per-flow traffic management and resource reservation on each edge and boundary router of a service provider's networks. Because boundary routers process thousands of traffic flows as network aggregation points, many vendors' boundary routers cannot install flow state for such a large number of flows. As a result, RSVP per-flow admission control has been rarely implemented and supported by router vendors. Thus, conventional Intserv per-flow admission control using RSVP remains undesirable due to its lack of scalability.

SUMMARY OF THE INVENTION

The present invention addresses the foregoing and additional shortcomings in the prior art by introducing an improved method, apparatus and system for performing admission control.

In accordance with one embodiment of the invention, a network system includes a boundary router, a second router, and an upstream link of the second router coupled between to the output port of the boundary router and an input port of the second router. The second router includes a data plane coupled between the input port and the output port and an admission control function. In response to a request to reserve resources for a flow through the second router, the admission control function performs admission control for both the upstream link and its downstream link. In a preferred embodiment, the second router performs admission control for the upstream link only if the second router is an edge router for the flow. Because the second router performs admission control for its upstream link, the boundary router transmits the request toward an upstream router without performing admission control for the link.

Additional objects, features, and advantages of the present invention will become apparent from the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

I. Network Model Overview

Figure 1:
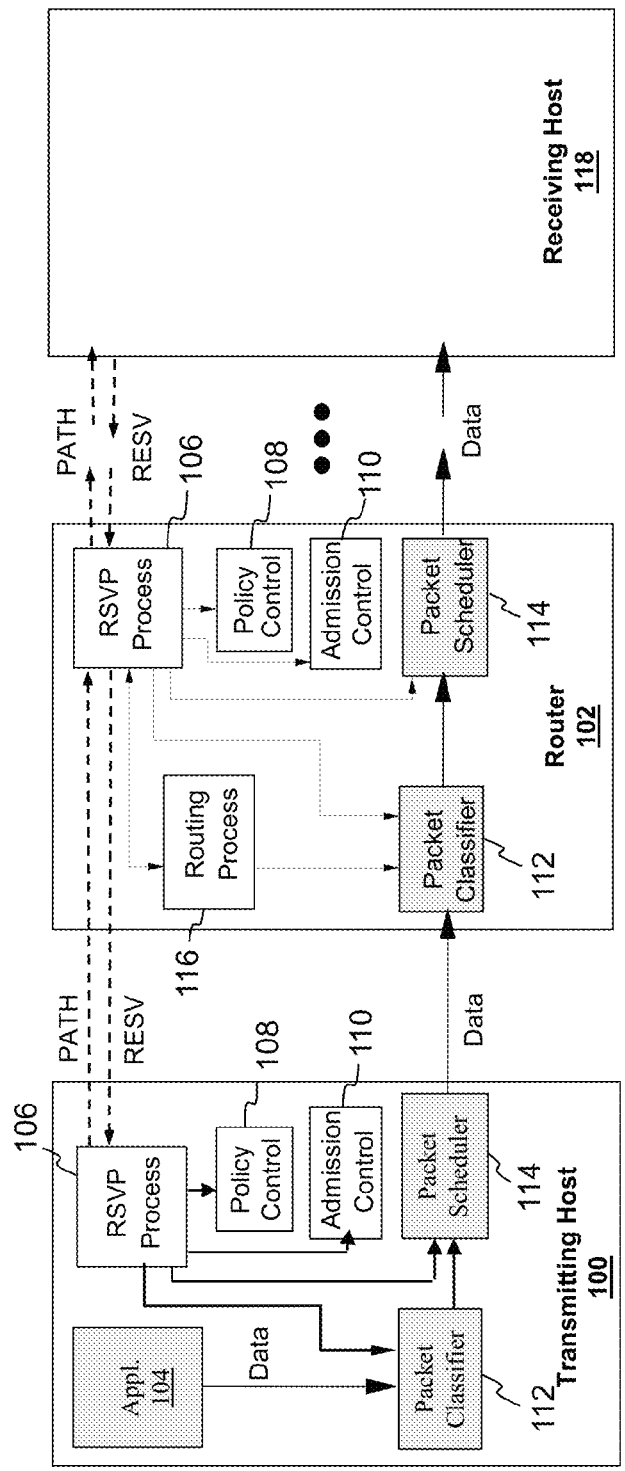
FIG. 1 depicts a conventional Integrated Services (Intserv) nodal processing model in which per-flow QoS is achieved utilizing RSVP signaling in accordance with RFC 2205.
Figure 2:
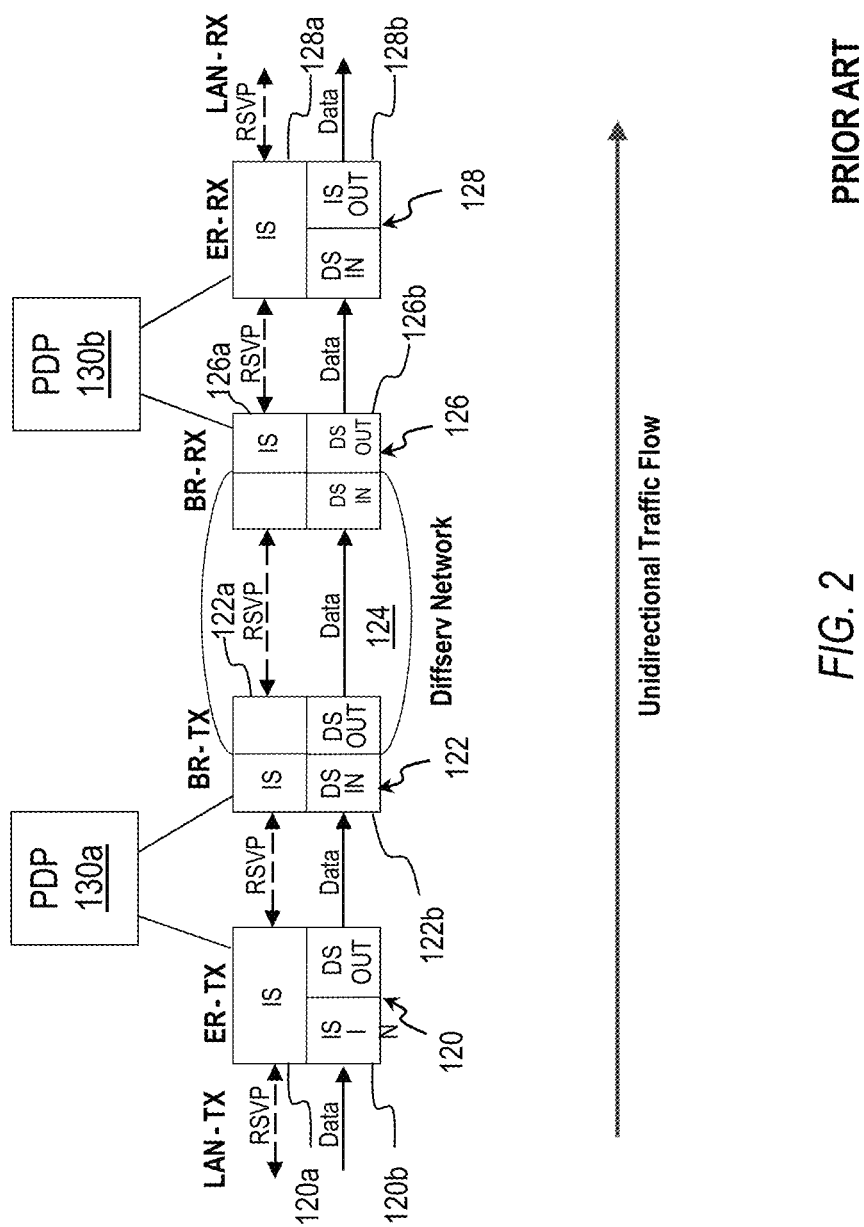
FIG. 2 illustrates a conventional network model in which Integrated Services (Intserv) are implemented over a Differentiated Services (Diffserv) domain in accordance with RFC 2998.
Figure 3:
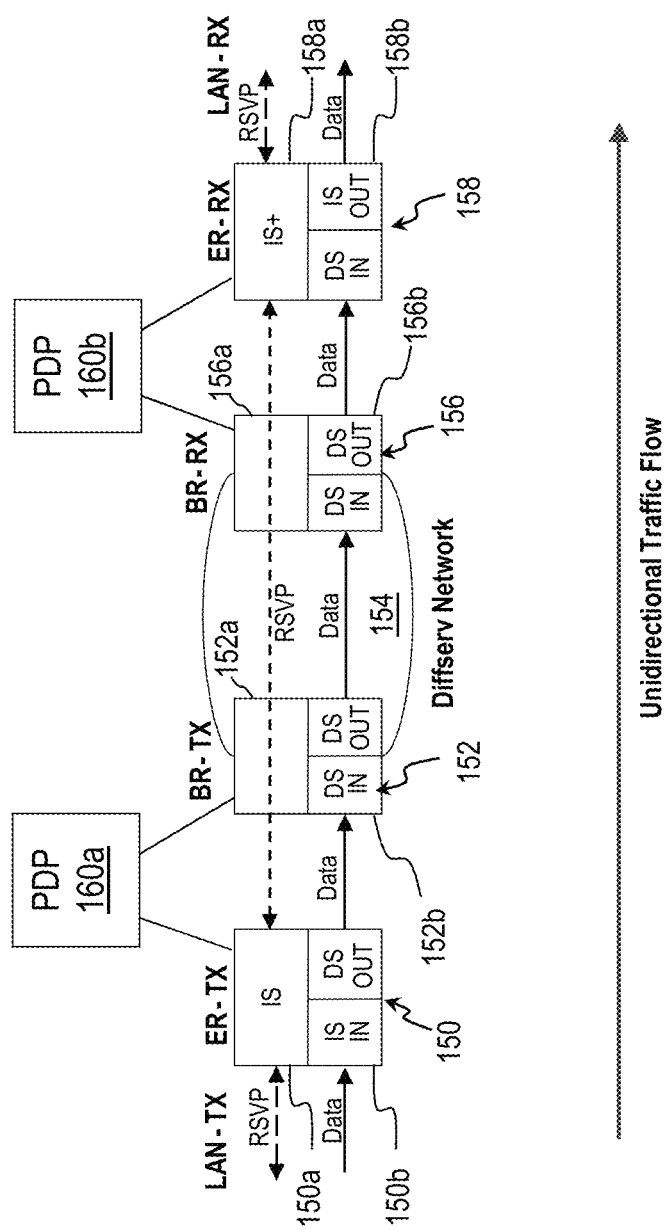
FIG. 3 is a high-level network model that, in accordance with a preferred embodiment of the present invention, implements Intserv over a Diffserv domain while eliminating Intserv processing in the boundary routers of the Diffserv domain.

With reference again to the figures and, in particular, with reference to FIG. 3, there is depicted a high level block diagram of an scalable network model that provides enhanced QoS to selected traffic by implementing edge-based Intserv over a Diffserv domain in accordance with the present invention. Specifically, as described in detail below, the illustrated network model improves network scalability by eliminating Intserv per-flow admission control from network devices in the Diffserv domain using a mechanism that maps per-flow bandwidth requirements to class-based resource pools for resource reservation and management. For ease of understanding, FIG. 3 employs the same receiver/transmitter and data plane/control plane notation utilized in FIG. 2.

In FIG. 3, Integrated Services-aware LAN-TX and LAN-RX, which may each contain one or more hosts, are connected to customer premises equipment (CPE) edge routers (ERs) 150, 158. Edge routers 150, 158 are in turn coupled by access networks (e.g., L2 access networks) to boundary routers (BRs) 152, 156 of Diffserv network 124. The network service provider configures routers 150, 152, 156 and 158 and installs admission control and other policies on 150, 152, 156 and 158 utilizing one or more PDPs 160.

Utilizing this configuration, the network model of FIG. 3 supports unidirectional traffic flow from transmitting hosts in LAN-TX to receiving hosts in LAN-RX. As is typical, such communication is preferably conducted utilizing a layered protocol architecture in which each protocol layer is independent of the higher layer and lower layer protocols. In one preferred embodiment, communication employs the well-known Internet Protocol (IP) at the network level, which corresponds to Layer 3 of the ISO/OSI (International Organization for Standardization/Open Systems Interconnect) reference model. Above the network layer, communication may employ TCP (Transmission Control Protocol) or UDP (User Datagram Protocol) in the transfer layer corresponding to Layer 4 of the OSI/ISO reference model.

Above the transfer layer, communication may employ any of a number of different protocols, as determined in part by the required QoS and other requirements of a flow. For example, the International Telecommunication Union (ITU) H.323 protocol and the IETF Session Initiation Protocol (SIP) are commonly utilized to provide signaling for voice, video, multimedia and other types of enhanced QoS sessions over an IP network. As an end-to-end protocol, SIP advantageously permits the end nodes with the capability to control call processing utilizing various call features (e.g., Find-me/Follow-me).

In contrast to the prior art network model illustrated in FIG. 2, which requires an Intserv control plane that performs Intserv processing in at least each edge and Diffserv boundary router, the network model illustrated in FIG. 3 employs Intserv processing only at the extreme edge of the network, that is, on network-managed CPE edge routers 150, 158. Thus, for the illustrated unidirectional packet flow, edge routers 150, 158 perform Intserv admission control utilizing RSVP signaling to provide enhanced QoS for a flow sent from LAN-TX to LAN-RX. Because edge routers 150, 158 perform Intserv admission control for Diffserv network 154 (and assuming that Diffserv network 154 has been well traffic engineered), there is no need to implement any additional admission control for Diffserv network 154. Consequently, in accordance with the present invention, none of the routers in Diffserv network 154, including boundary routers 152, 156 and unillustrated core routers, is required to have an Intserv control plane, as indicated at reference numerals 152a and 156a. Consequently, boundary routers 152 and 156 can be significantly simplified to promote enhanced scalability of the service provider network.

To achieve this advantageous simplification in boundary routers 152, 156, the network model of FIG. 3 implements modifications to the conventional Intserv RSVP signaling model, which, as described above, always performs symmetric processing at each node to perform admission control for the downstream link. In the network model illustrated in FIG. 3, the RSVP RESV message returned by the receiving host is processed only by the Intserv control planes 150a, 158a of edge routers 150, 158, which verify the availability of the requested resources and adjust resource counts accordingly. In particular, Intserv control plane 150a of ER-TX 150 performs downstream admission control for the link between itself and BR-TX 152. Intserv control plane 158a of ER-RX 158, however, performs admission control not only for its downstream link (i.e., LAN-RX), but also for the upstream link itself and BR-RX 156 because boundary routers 152, 156 are not RSVP-aware.

Although conceptually elegant, this network model shown in FIG. 3 has a number of non-trivial challenges that must be addressed in order to obtain operative network implementations. For example, because conventional Intserv RSVP signaling is symmetrical at each node, no conventional mechanism is provided to inform ER-RX 156 that it is the "receiving" edge router and must therefore perform admission control for its upstream link. In addition, conventional Intserv RSVP signaling does not provide ER-RX 156 with any information regarding the resource capacity and resource availability of the upstream link for which admission control must be performed. Moreover, RFC 2998 (and the art generally) does not provide any guidance regarding how to implement Diffserv/Intserv interworking at ER-TX 150 and, in particular, does not disclose how to map Intserv classes to Diffserv classes. Preferred solutions to these and other issues concerning an implementation of the network model shown in FIG. 3 are described in detail below.

II. Receiving Edge Router Identification

Figure 4:
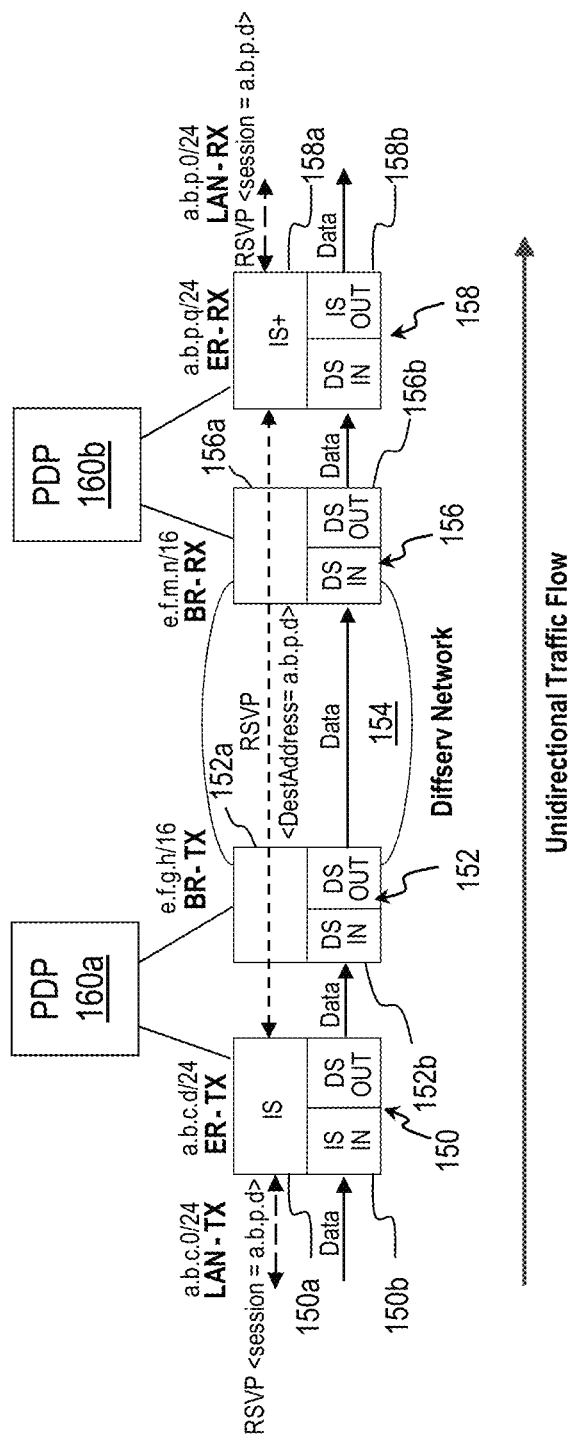
FIG. 4 illustrates one method by which the receiving edge router of a traffic flow can be identified within the network model of FIG. 3.

Referring now to FIG. 4, there is depicted one preferred method by which an edge router, such as ER-RX 158, can determine that it is the receiving edge router. In the depicted operating scenario, each of the customer LANs, edge routers 150, 158 and boundary routers 152, 156 has a different IP address, and the customer LANs coupled to ER-RX 158 are each assigned an IP address that is a subnet of the IP address assigned to ER-RX 158.

As noted above, a transmitting host in LAN-TX initiates an enhanced QoS session with a receiving host in LAN-RX by transmitting an RSVP PATH message. Based upon the destination address (DestAddress) specified in the PATH message, which in the illustrated example is a.b.p.d, the PATH message is routed to across Diffserv network 154 to LAN-RX. In response to the PATH message, the receiving host transmits an RSVP RESV message containing a SESSION object that specifies the destination address. Upon receipt of the RESV message, the RSVP process in Intserv control plane 158a of ER-RX 158 can determine whether ER-RX 158 is the receiving edge router by comparing the destination address with the IP subnet address of each attached customer LANs. If and only if the destination address falls into one of its attached customer subnets, ER-RX 158 "knows" it is the receiving edge router for the traffic flow. For example, when ER-RX 158 receives a RESV message having a SESSION object containing destination address a.b.p.d, ER-RX 158 knows that it is the receiving edge router since the IP address of LAN-RX (i.e., a.b.p.d) is an IP subnet address of a.b.p. 0/24. ER-RX 158 therefore performs Intserv admission control for its upstream link for the enhanced QoS flow.

Although this method of identifying the receiving edge router has the advantage of simplicity, it requires that each destination address specify a subnet of the receiving edge router's IP address. In implementations in which this restriction is not desirable, alternative methods of identifying the receiving edge router may be employed. For example, as described below in detail with respect to FIG. 6, the receiving edge router may alternatively be identified through an Edge Point Identification table configured on edge routers 150, 158 by PDPs 160. These policy data structures specify one or more ranges of IP addresses for which a router is the receiving edge router.

III. Resource Management

To track resource availability (including the resource availability utilized to perform upstream admission control), each Intserv-aware edge router maintains a separate or shared virtual pool in its control plane for each Intserv class, where each virtual pool represents the resource availability for the associated Intserv class(es) on a link for which the router performs admission control. Whenever an edge router receives an RSVP RESV message, the edge router performs admission control on the link by checking the requested bandwidth against the appropriate virtual pool to determine resource availability in the requested Intserv class. If the virtual pool indicates the requested bandwidth is less than the available bandwidth, the reservation request is approved and the reservable resources of virtual pool are reduced by the amount of reserved bandwidth. If, however, the requested bandwidth exceeds the virtual pool's available bandwidth the QoS request is denied.

Interworking between the Intserv admission control and Diffserv data plane functions is achieved by association of the virtual pools utilized to perform Intserv admission control with the logical queues employed by Diffserv to deliver classbased QoS on the data plane. In particular, each Intserv class is uniquely associated with one and only one Diffserv logical queue. However, like the virtual pools utilized to perform Intserv admission control, a separate logical queue can be implemented for each of one or more Intserv classes, and one or more logical queues may be implemented as shared queues that are associated with multiple Intserv classes.

Table I below summarizes the possible combinations of logical queues and virtual pools that may be implemented within the boundary and edge routers of a service provider network.

TABLE I

| Logical Queue | Virtual pool | |
|---|---|---|
| | Separate | Shared |
| Separate | Case 1 | Not Applicable |
| Shared | Case 3 | Case 2 |

As shown in Table I, three cases are possible: separate virtual pools with separate logical queues, shared virtual pools with shared logical queues, and separate virtual pools with shared logical queues. The case of a virtual pool shared by multiple Intserv classes is not applicable to an implementation having separate logical queues for each Intserv class, since no virtual pool information would be available on an individual class basis. Importantly, boundary and edge routers in the same network may be configured to concurrently implement different cases, as long as marking is correctly performed.

Figure 5:
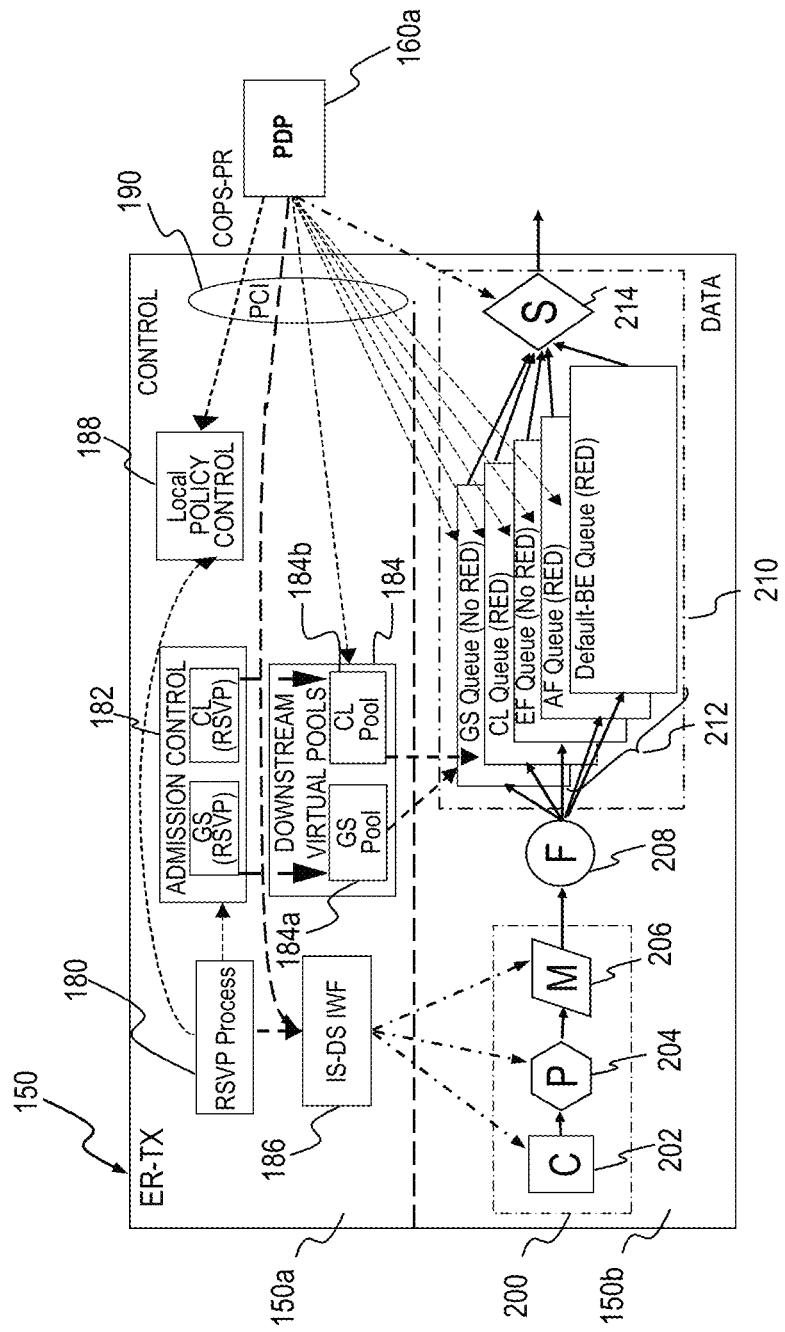
FIG. 5 is a more detailed block diagram of a transmitting edge router in accordance with a preferred embodiment of the present invention.
Figure 6:
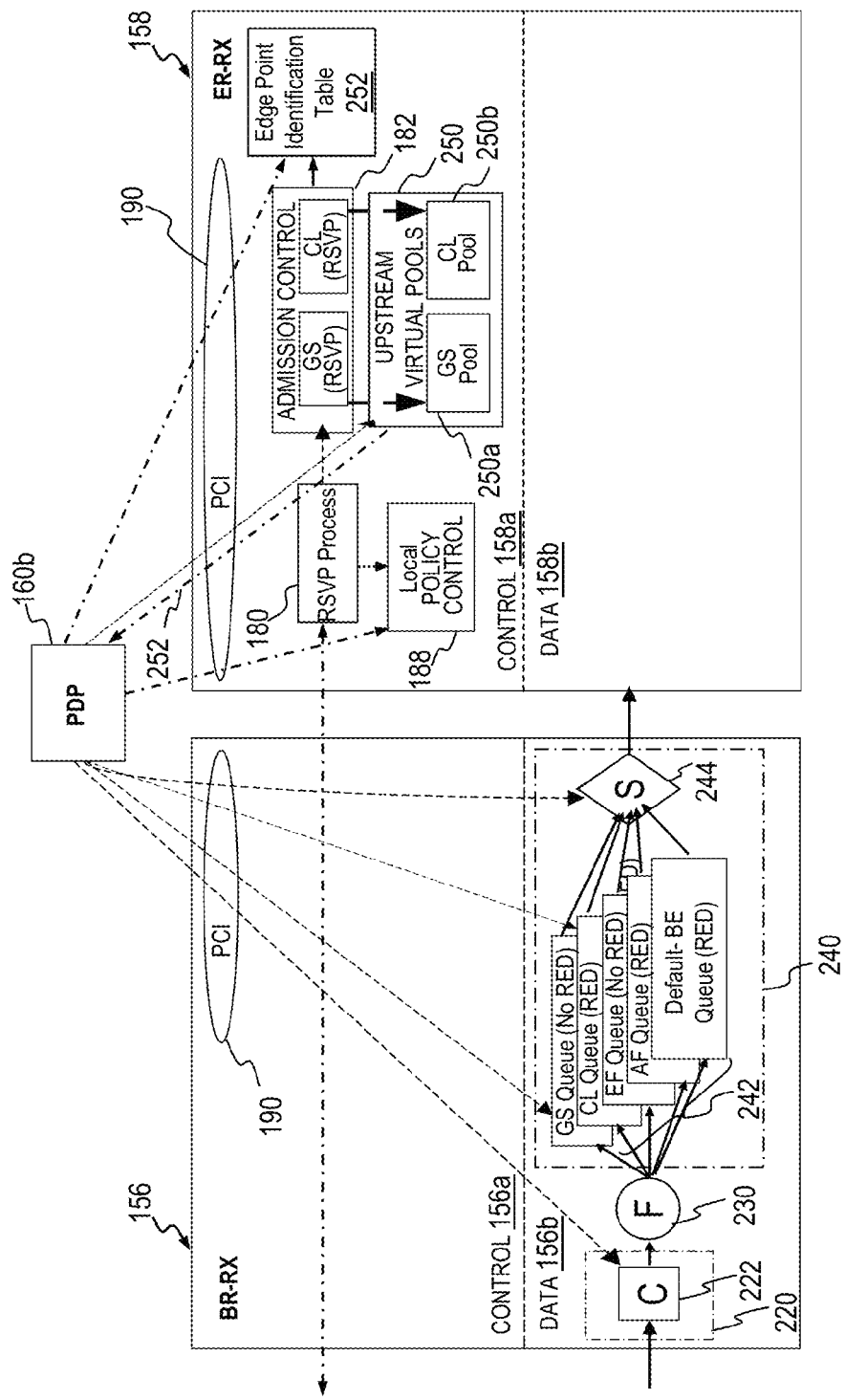
FIG. 6 is a more detailed block diagram of a receiving boundary router and receiving edge router in accordance with a preferred embodiment of the present invention.

With reference now to FIGS. 5 and 6, there are depicted more detailed block diagrams of edge and boundary routers of the network model of FIG. 3 in which traffic in each Intserv service class is assigned a separate virtual pool in the control plane and separate logical queue in the data plane in accordance with Case 1 of Table I. Referring first to FIG. 5, a more detailed block diagram of ER-TX 150 is depicted. As noted above, ER-TX 150 has an Intserv control plane 150*a*, which manages RSVP signaling and implements Intserv policy and admission control, and a data plane 150*b*, which provides the link level delivery of Diffserv class-based QoS. Control plane 150*a* includes an RSVP process 180, an admission control block 182 having associated virtual pools 184, a policy control block 188, an IS-DS interworking function (IWF) configuration block 186, and a Policy Configuration Interface (PCI) 190 through which ER-TX 150 communicates policy information with PDP 160*a*. Data plane 150*b* has an input port 200, a forwarding function 208, and an output port 210 having a number of queues 212 that each corresponds to a Diffserv class.

As described above, RSVP process 180 in control plane 150*a* handles RSVP signaling (e.g., PATH and RESV messages) utilized to reserve (and release) resources for enhanced QoS flows. In response to receiving a RESV message requesting resources for an enhanced QoS flow, RSVP process 180 interrogates admission control block 182 and policy control block 188 to verify that the requestor has administrative permission to establish the QoS flow and that the downstream interface has sufficient available resources to support the requested QoS. In addition to determining administrative permission, policy control block 188 can execute additional policies, such as authentication based on certificates or signatures, management of bandwidth distribution among the authorized requestors, and preemption of allocated resources for a pending, higher-priority flow.

In the illustrated embodiment, each supported Intserv class (e.g., Guaranteed Service (GS) and Controlled Load (CL)) has a separate virtual pool 184*a*, 184*b*. Admission control block 182 monitors the availability of resources on the downstream link for each Intserv class using virtual resource pools 184. Thus, admission control block 182 grants reservation requests when sufficient available bandwidth is available in the virtual pool associated with the requested Intserv class and otherwise denies the reservation request. Admission control block 182 reduces the available resources in a virtual pool by the amount requested by each successful reservation, and increases the reservable resources in a virtual pool by the amount of resources freed upon termination of a flow. Importantly, the number of virtual pools, the bandwidth allocated to each virtual pool 184, and the mapping between the virtual pools and Diffserv classes are not fixed, but are instead expressed as policies that are installed at ER-TX 150 (and other network elements) by a PDP 160. Utilizing Common Open Policy Service (COPS) or other protocol, such policies may be pushed onto network elements by PDP 160 or pulled from PDP 160 by a network element, for example, in response to receipt of an RSVP RESV message.

PDP 160*a* configures the mapping between Intserv classes and Diffserv classes (and DSCPs) on IS-DS IWF configuration block 186 (e.g., GS to DSCP 100011, CL to DSCP 010011). IS-DS IWF configuration block 186 may also receive configurations from RSVP process 180. Based upon these configurations, IS-DS IWF configuration block 186 dynamically provisions a packet classifier 202, policer 204, and marker 206 on input port 200 for each Intserv flow. (In some implementations, packet classifier 202, policer 204, and marker 206 may be implemented as a single integrated module, such as a Field Programmable Gate Array (FPGA) or Application Specific Integrated Circuit (ASIC).)

In accordance with this provisioning, packets within each Intserv flow, whose service class is indicated by an Intserv 5-tuple, are classified and marked by packet classifier 202 and marker 206 with the appropriate DSCP of the aggregate Diffserv class (e.g., with one of the 16 code points (Pool 2xxxx11) reserved for experimental or local use). In this manner, Intserv flows having enhanced QoS are aggregated into preferential Diffserv classes. Because the embodiment shown in FIG. 5 reflects Case 1 from Table I, a separate logical queue 212 is provided on port 210 for each supported Intserv class (GS and CL) in addition to the logical queues assigned to other Diffserv classes (e.g., the Expedited Forwarding (EF), Assured Forwarding (AF) and default Best Effort (BE) classes). Scheduler 214 then provides the appropriate QoS to the packets within each logical queue 212 by scheduling packet transmission from logical queues 212 in accordance with scheduler weights assigned to each logical queue 212 by PDP 160*a*.

Because the illustrated embodiment of ER-TX 150 is managed by the network service provider, ER-TX 150 can be trusted by the network service provider to correctly mark packets with DSCPs so that no "theft" of QoS occurs. In alternative embodiments in which ER-TX is not managed by the network service provider, PDP server 160a may provide the Diffserv classification policies to BR-TX 152 instead of ER-TX 150. It should also be noted that core routers of Diffserv network 154 need not implement separate Diffserv queues for Intserv flows, even if separate queues are implemented on edge and boundary routers.

Referring now to FIG. 6, there are illustrated more detailed block diagrams of BR-RX 156 and ER-RX 158 in accordance with a preferred implementation of Case 1 of Table I. As noted above, BR-RX 156 and ER-RX 158 have respective control planes 156a, 158a and data planes 156b, 158b. Control plane 158a of ER-RX 158 is an enhanced Intserv control plane including a PCI 190, an RSVP process 180 having associated admission and policy control blocks 182 and 188, and an edge point identification table 252 and upstream virtual pools 250 by which admission control block 182 performs upstream admission control. BR-RX 156a, by contrast, has no Intserv control plane, but instead includes only a PCI 190 through which the components of data plane 156b are configured by PDP 160b.

Within control plane 158a of ER-RX 158, PDP 160b installs policies by which local policy control 188 determines which customers having administrative permission to request resource reservations for enhanced QoS flows. In addition, PDP 160b installs an edge point identification table 252 that specifies one or more ranges of destination IP addresses for which ER-RX 158 is the receiving edge router. Thus, upon receipt of a RESV message requesting an enhanced QoS flow for which the customer is granted administrative permission by policy control 188, admission control 182 interrogates edge point identification table 252 to determine if ER-RX 158 is the receiving edge router for the requested flow. If not, ER-RX 158 performs only conventional downstream admission control. However, if edge point identification table 252 indicates that ER-RX 158 is the receiving edge router for the requested flow, admission control block 182 performs upstream admission control by reference to the upstream virtual pool capacities allocated by PDP 160b to each Intserv class within virtual pools 250. As described generally above, each virtual pool 250a, 250b is utilized by admission control block 182 to ascertain the availability of sufficient bandwidth for a requested flow of a particular Intserv class on the upstream link between ER-RX 158 and BR-TX 152. As indicated at reference numeral 252, PDP 160b obtains periodic or solicited feedback regarding virtual pool usage on ER-RX 158 and dynamically coordinates any operator-initiated adjustments to the capacities of the virtual pools with updates to the logical queue(s) and scheduler weight(s) implemented in the data plane to ensure that the Intserv bandwidth actually utilized is less than the operator-specified capacity.

Referring now to the data plane, data plane 158b of ER-RX 158 may be implemented with conventional classification, forwarding and Intserv queuing, the details of which are omitted to avoid obscuring the present invention. Data plane 156b of BR-RX 156 includes an input port 220 having a classifier 222, an output port 240 having a plurality of Diffserv physical queues 242 and a scheduler 244, and a forwarding function 230 that switches packets from the input port to the appropriate physical queues 242 on output port 240 in accordance with the classification performed by classifier 222. As indicated, classifier 222 and physical queues 242 are configured by PDP 160b in a coordinated manner to reflect the configuration of upstream Intserv virtual pools on control plane 158a of ER-RX 158. In particular, in the illustrated embodiment, classifier 222 is configured to identify packets belonging to the separate Diffserv classes into which Intserv traffic are aggregated, such the packets in each Diffserv class representing an Intserv traffic type are forwarded to separate physical queues 242 for Intserv GS and CL classes on output port 240. PDP 160b also configures the scheduling weight scheduler 244 gives each of queues 242. In addition, PDP 160 coordinates the sum of the virtual pool capacities on ER-RX 158 with the resource pool capacity dictated by queue capacities and weights in data plane 156b of BR-RX 156 to ensure that the virtual pool capacity does not exceed the actual resource pool capacity. Thus, in essence, ER-RX performs upstream admission control as a proxy for BR-RX.

Mapping different Intserv classes to separate virtual pools and Diffserv queues as shown in FIGS. 5 and 6 permits better traffic management than mapping all Intserv classes to a single Diffserv queue. By preserving the distinction between Intserv classes over the Diffserv network in this manner, different traffic types (e.g., VoIP, VideoIP and file transfer) can be provided optimal handling, and enterprise resource planning is simplified. However, as noted above, some or all routers in a service provider network may alternatively be implemented in accordance with Cases 2 and 3. To implement Case 2 instead of Case 1, ER-TX 150 and ER-RX 158 are configured with a single shared virtual pool for multiple Intserv classes, and ER-TX 150 and BR-RX 156 are configured with a single shared logical queue for the multiple Intserv classes. Alternatively, to implement Case III, ER-TX 150 and ER-RX 158 are configured with separate virtual pools, and ER-TX 150 and BR-RX 156 are each configured with a single shared queue for multiple Intserv classes.

It should be noted that no flow-specific network configuration of control plane 152a or data plane 152b of BR-TX 152 is required in order to provide enhanced QoS to particular flows. This is because the admission control provided by downstream ER-RX 158 ensures that the downstream link of BR-TX 152 has sufficient bandwidth to support each admitted enhanced QoS flow, and the mapping of Intserv flows to particular Diffserv classes ensures that data plane 152b achieves the requested QoS.

IV. PDP

Figure 7:
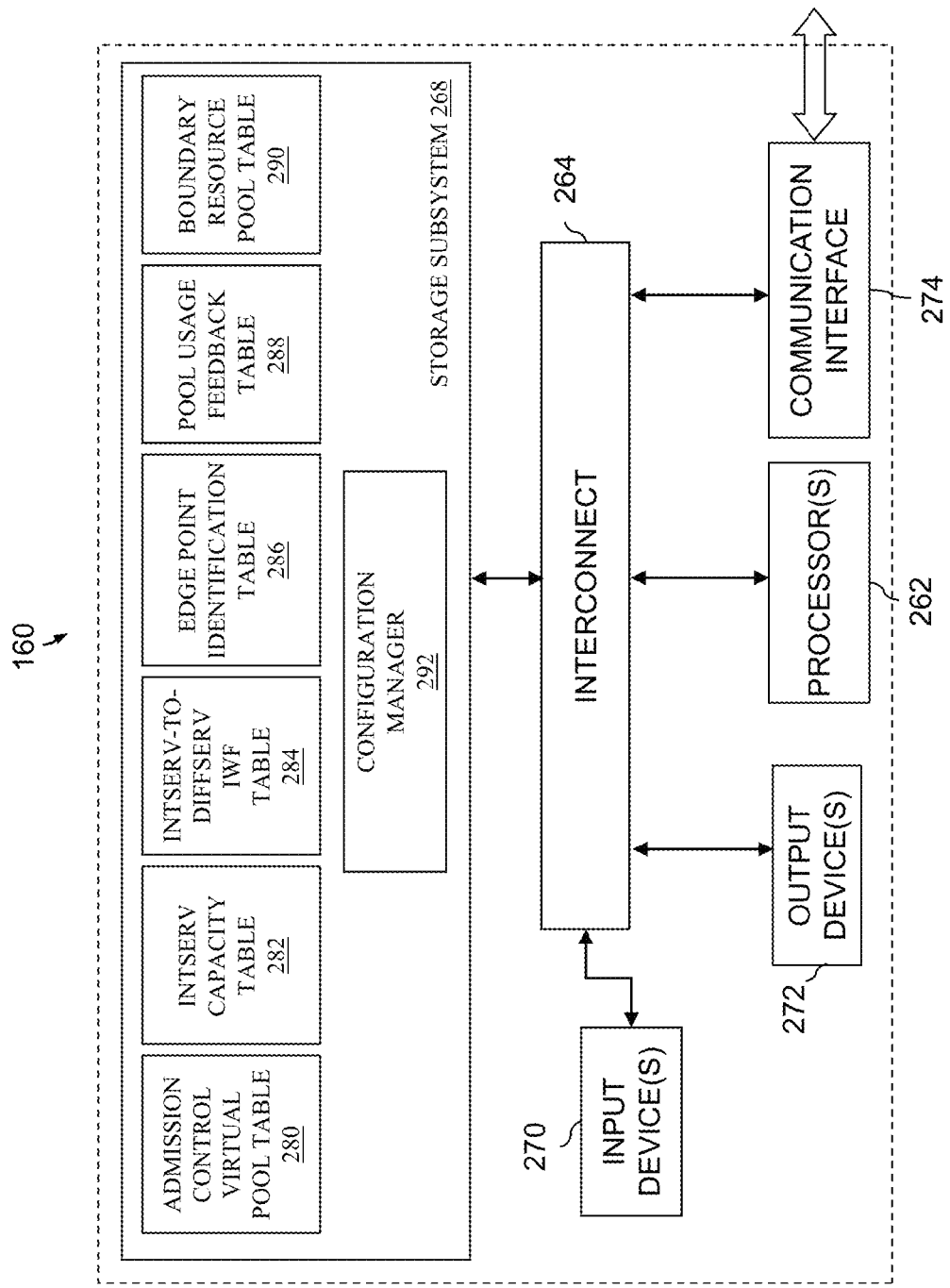
FIG. 7 is a block diagram of an exemplary server computer system that may be utilized to implement a Policy Decision Point (PDP) in accordance with a preferred embodiment of the present invention.

With reference now to FIG. 7, there is depicted a high level block diagram of a server computer system that may be employed as a PDP 160 in accordance with a preferred embodiment of the present invention. PDP 160 includes one or more processors 262 coupled by an interconnect 264 to a storage subsystem 268, which may comprise random access memory (RAM), read only memory (ROM), magnetic disk, optical disk and/or other storage technology. Storage subsystem 268 provides storage for data (e.g., tables 280-290) and instructions (e.g. configuration manager 292) processed by processor(s) 262 to configure network elements and to install and determine network policies. Also coupled to interconnect 264 may be one or more input devices (e.g., a keyboard and/or graphical pointing device) 270 and one or more output devices (e.g., a display) 272, as well as a communication interface 274 through which computer system 260 may communicate with network devices, such as routers 150, 152, 156 and 160.

To configure and install policies on routers 150, 156, 160 in the manner described above, each PDP 160 preferably implements a number of Policy Rule Class (PRC) tables within storage subsystem 268. In one preferred embodiment, these PRC tables include at least an Admission Control Virtual Pool Table 280, Intserv Capacity Table 282, Intserv-to-Diffserv Interworking Function Table 284, Edge Point Identification Table 286, Pool Usage Feedback Table 288, and Boundary Resource Pool Table 290.

Admission Control Virtual Pool Table 280 determines the capacities of the virtual pools on edge routers 150, 158 that are utilized to perform admission control for various Intserv classes. In Admission Control Virtual Pool Table 280, the sum of the capacities assigned to the virtual pools associated with all Intserv classes is set to be less than the data plane queue capacity of the associated boundary router to ensure that the requested QoS of each admitted flow can be achieved in the data plane. The table further specifies whether the admission control will accept reservations and the logical interface name of the boundary router associated an edge router. In an exemplary embodiment, Admission Control Virtual Pool Table 280 may be defined as follows:

| AdmCtlVirtualPoolTable |
|---|
| Logical Interface Name |
|     Description: This SNMP string identifies the logical interface associated with the AdmCtlVirtualPool entry. |
|     Object Type: SNMP string |
| Direction |
|     Description: This attribute indicates the relationship of the traffic stream to the interface as either (1) inbound or (2) outbound. This attribute is used in combination with the BoundaryLogicalInterfaceName to differentiate ER-RX virtual resource pools and ER-TX virtual resource pools. An ER-RX upstream virtual resource pool has an inbound Direction and non-empty BoundaryLogicalInterfaceName. An ER-TX downstream virtual resource pool has an outbound Direction and a non-empty BoundaryLogicalInterfaceName attribute. An ER-RX downstream virtual resource pool has an outbound Direction and an empty BoundaryLogicalInterfaceName attribute. |
| IntSrvClass |
|     Description: This bit string indicates the Intserv class or classes that have resources allocated by admission control from this virtual pool. |
|     Object Type: bits |
|         Controlled Load Service (1) |
|         Guaranteed Services (2) |
|         Null Service (3) |
|         Other (4) |
| VirtualPoolMaxAbsRate |
|     Description: the maximum absolute rate in kilobits that this pool may allocate to Intserv sessions defined by the AdmCtlIntSrvClass. The sum of ER-RX upstream virtual resource pools is not to exceed the ResourcePoolMaxAbsRate for the associated BoundaryInterfaceName. |
|     Object Type: Unsigned 32 |
| BoundaryLogicalInterfaceName |
|     Description: identifies the adjacent boundary router and resource pool that governs the capacity of the local virtual pool defined by this entry. An empty attribute signifies that the VirtualPoolMaxAbsRate is governed by a local ResourcePoolMaxAbsRate defined for the LogicalInterfaceName of this entry. A non-empty attribute indicates that a remote virtual pool capacity defined for this BoundaryLogicalInterfaceName governs the value of the VirtualPoolMaxAbsRate of this entry. |
|     Object Type: SNMP string |
| AcceptReservations |
|     Description: This value indicates whether Admission Control will attempt to process RSVP RESV requests. A value of 0 indicates that reservations are not to be processed. A value of 1 indicates reservations are to be processed. |
|     Object Type: Unsigned 32 |

Intserv Capacity Table 282 defines the data plane data rate capacity allocated to Intserv classes in terms of both Diffserv queue weights and shaper parameters. These rate capacities are also associated by the table with one or more edge router virtual pools. This Policy Rule Class, according to one preferred embodiment, is contained in the Differentiated Services Policy Information Base (PIB).

Intserv-to-Diffserv IWF Table 284 defines the attributes used for interworking between the RSVP process in the control plane and Diffserv in the data plane. These attributes are used by classifier 202, policer 204, and marker 206 on input port 200 of ER-TX 150 to classify, police and mark Intserv traffic flows so that Diffserv achieves the appropriate QoS for each flow. In addition, the table specifies the specific scheduler instance to be used for flows having particular Intserv classes. An exemplary embodiment of Intserv-to-Diffserv IWF Table 284 is as follows:

| Intserv-to-Diffserv Interworking Function Table |
|---|
| IwfPrid |
|     Description: This is the unique identifier of the PktIwfTable entry. |
|     Object Type: Instance ID (unsigned 32) |
| IwfIntSrvClass |
|     Description: The value of the Intserv Class associated with the attributes of this specific interworking function entry. (It must have a corresponding bit set in AdmCtlIntSrvClass) |
|     Object Type: unsigned 32 |

-continued

Intserv-to-Diffserv Interworking Function Table

IwfDSCP
    Description: The value of the DSCP to assign the data steam for the session
    with the Intserv class type matching the value of PktIwfIntSrvClass.
    Object Type: integer value 0-63
IwfOutOfProfile
    Description: This value indicates the policing behavior when the data
    stream is out of profile. The profile can be defined by the associated
    MeterTableEntry. A value of 1 indicates out-of-profile packets are to be
    dropped. A value of 2 indicates out-of-profile packets are to be remarked
    with the DSCP defined in IwfRemarkValue.
    Object Type: Unsigned 32
IwfRemarkValue
    Description: The value of the DSCP to remark an out-of-profile packet.
    This value is only used if the IwfOutOfProfile is set to 2.
    Object Type: Unsigned 32 value 0-63
IwfSchedulerPrid
    Description: The value of the instance ID of the specific scheduler to be
    used by data streams of the sessions with an Intserv class matching the
    value of attribute IwfIntSrvClass.
    Object Type: Unsigned 32

Edge Point Identification Table 286 defines a range or ranges of addresses for which an edge router is a receiving edge router. This information may be configured on PDP 160 initially or may be learned locally. Admission control block 182 on ER-RX 158 performs upstream admission control for reservation requests that specify a destination address within the RSVP SESSION Object that falls within one of these address ranges. The values for a particular edge router may be pushed down by PDP 160 to the local Edge Point Identification Table 252 utilizing COPS or other policy protocol. According to one embodiment, Edge Point Identification Table 286 may be defined as follows:

End Point Identification Table

ReceiverDomainPrid
    Description: unique identifier of an entry of this policy rule class
    Object Type: Instance ID, a 32 bit unsigned integer.
ReceiverAddrType
    Description: The enumeration value that specifies the address type as
    defined in RFC 2851
    Object Type: INET Address Type as defined by RFC 2851
ReceiverAddr
    Description: The IP address for the Session Object Destination
    Address to match
    Object Type: INET Address as defined by RFC 2851
ReceiverAddrMask
    Description: the length of the mask for matching the INET Address
    Object Type: unsigned 32

Pool Usage Feedback Table 288 contains entries that specify the current resources consumed by Intserv flows. This PRC table, which is used by PDP 160 to determine when to complete provisioning an operator-initiated capacity update, may in an exemplary embodiment be defined as follows:

Pool Usage Feedback Table

Usage Feedback Prid
    Description: unique identifier of the Virtual Pool Usage Feedback
    entry.
    Object Type: Instance Id. (unsigned 32)
PoolPrid
    Description: value of the instance ID of the specific
    AdmCtlVirtualPool entry that usage is describing.
    Object Type : Unsigned 32
ResourceAbsRateInUse
    Description: current total value of the Intserv resources in use.

Boundary Resource Pool Table 290 defines the total rate capacity that may be assigned by PDP 160 to the various admission control virtual pools associated with a given egress boundary router (BR-RX). This PRC table may be defined in an exemplary embodiment as follows:

Boundary Resource Pool Table

BoundaryResourcePool TableBoundaryResourcePoolPrid
    Description: unique identifier of the Virtual Pool Usage Feedback
    entry
    Object Type: Instance Id. (unsigned 32)
BoundaryLogical Interface Name
    Description: identifies the adjacent boundary router and resource pool
    that governs that capacity of the local virtual pools associated with
    this entry in the AdmissionCtlVirtualPool Table
    Object Type: SNMP string
ResourcePoolMaxAbsRate
    Description: maximum absolute rate in kilobits that may be allocated
    to IntServ sessions defined by the AdmCtlIntSrvClass. The sum of
    ER-RX upstream virtual pools is not to exceed the
    ResourcePoolMaxAbsRate for the associated
    BoundaryInterfaceName.
    Object Type: Unsigned 32

V. Network Configuration

Figure 8A:
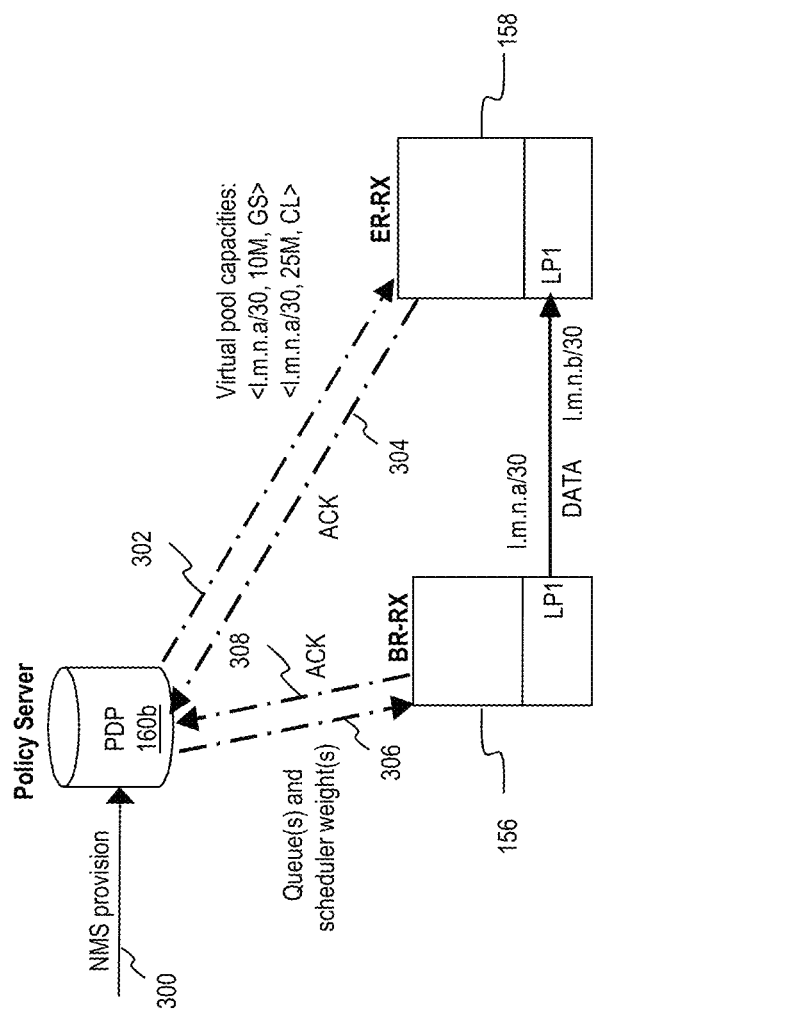
FIG. 8A depicts a preferred method of installing policies on a receiving boundary router and receiving edge router during service initialization.
Figure 8B:
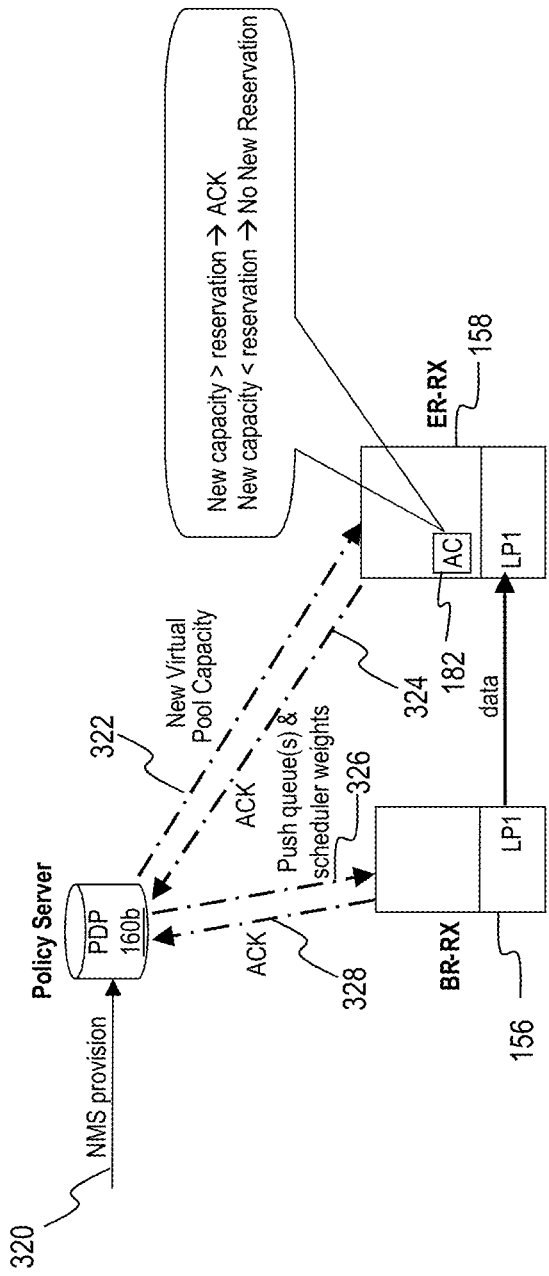
FIG. 8B illustrates a preferred method of installing policies on a receiving boundary router and receiving edge router in response to a service update.
Figure 8C:
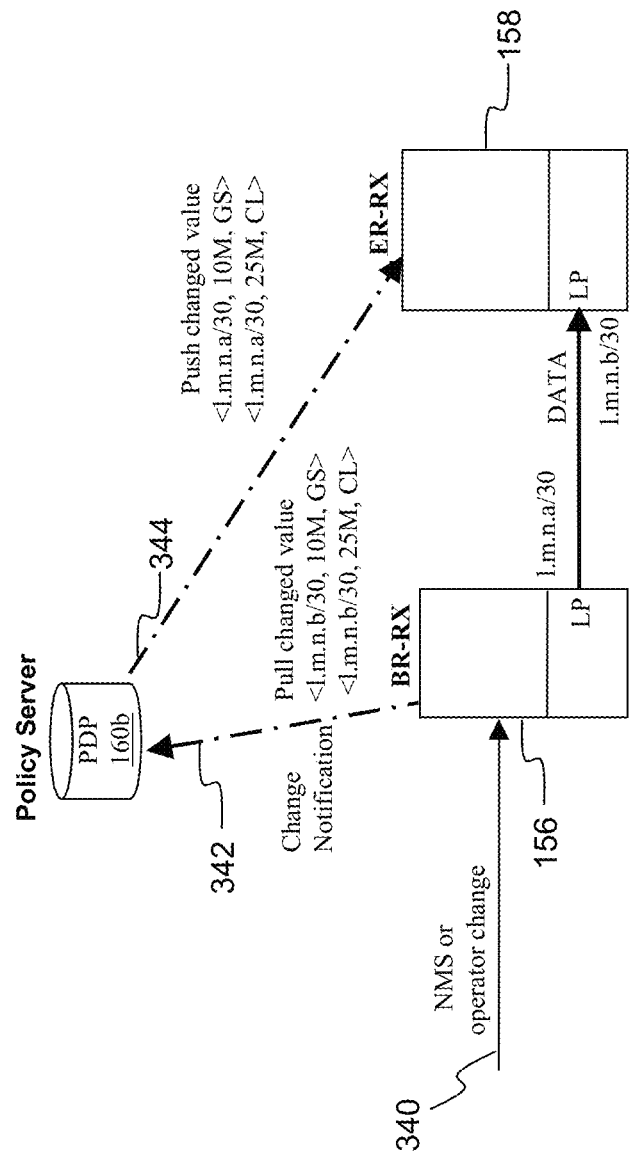
FIG. 8C depicts a preferred method of policy synchronization following a direct service update to a receiving boundary router.

With reference now to FIGS. 8A-8C, a number of network diagrams are depicted, which together illustrate preferred techniques by which PDP 160b configures and installs policies on BR-RX 156 and ER-RX 158. The illustrated functions may be implemented, for example, through the execution by PDP 160 of configuration manager software 292. In each figure, it is assumed that communication between PDP 160b and routers 156, 158 is conducted utilizing COPS, although it should be understood that other protocols may be employed.

FIG. 8A specifically illustrates PDP 160b synchronizing virtual pool capacities on ER-RX 158 with Diffserv logical queue bandwidths on BR-RX 152 during service initialization. As indicated at reference numeral 300 of FIG. 8A, a Network Management System (NMS) may initiate the configuration of Intserv capacity for a customer, for example, during service initialization. In response, PDP 160b pushes the configuration of Intserv virtual pool capacities onto each network-managed edge router (of which only ER-RX 158 is shown) that is downstream of a boundary router of Diffserv network 154. For example, in the depicted embodiment, PDP 160b pushes the virtual pool capacity for each Intserv class supported by LP1 at interface 1.m.n.b/30 onto ER-RX 158 with a message allocating 10 megabits to the Intserv GS class and 25 megabits to the Intserv CL class. If the configuration is successfully installed on ER-RX 158, ER-RX 158 replies with an acknowledgement (ACK) message, as shown at reference numeral 304. PDP 160*b*, as indicated at reference numeral 306, then pushes the corresponding configuration of Diffserv queue(s) and scheduler weight(s) onto BR-RX 156. BR-RX 156 also returns an ACK 308 to PDP 160*b* if the configuration is successfully installed.

If ER-RX 158 fails to install the virtual pool capacities pushed down by PDP 160*b*, ER-RX 158 returns a negative acknowledgement (NACK) to PDP 160*b*. PDP 160*b* accordingly sends a warning message to a network operator, such as "Fail to configure Integrated Services virtual pool on ER XX!" Similarly, if the queue(s) and scheduler weight(s) cannot be installed on BR-RX 156, BR-RX 156 returns an NACK to PDP 160*b*. In response, PDP 160*b* transmits a message to ER-RX 158 to release the configuration of the virtual pools and may also send a warning message to a network operator stating: "Fail to configure Queue and Scheduler on BR XX!"

It should be noted that PDP 160*b* may not directly communicate with network elements, such as BR-RX 156 and ER-RX 158, but may instead communicate through other network elements. For example, messages between PDP 160*b* and BR-RX 156 may be communicated through ER-RX 158.

Attention is now turned to a scenario in which a service update (i.e., an increase or decrease in subscribed Intserv capacity) is performed for an existing network service customer. Increasing or decreasing the BR-RX capacity when the currently reserved bandwidth is below the new subscribed capacity is a straightforward process because the new capacity can accommodate all ongoing customer traffic, meaning no service impact will be observed. However, decreasing the BR-RX capacity when the currently reserved bandwidth is greater than the newly requested capacity requires coordination among PDP 160*b*, BR-RX 156, and ER-RX 158, as described below with respect to FIG. 8B.

In FIG. 8B, the NMS may initiate the reconfiguration of Intserv capacity for an existing network service customer, as depicted at reference numeral 320. As shown at reference numeral 322, PDP 160*b* installs the new virtual pool capacity value(s) on ER-RX 158. Admission control block 182 of ER-RX 158 compares each new virtual pool capacity value with the amount of resources currently reserved within each virtual pool. If the new virtual pool capacity value(s) are greater than the amount of resources currently reserved from each virtual pool, admission control block 182 of ER-RX 158 overwrites the virtual pool capacity value(s) with the new value(s) and immediately sends an ACK 324 to PDP 160*b*. However, if the new virtual pool capacity value(s) are less than the amount of currently reserved resources, admission control block 182 of ER-RX 158 saves the new capacity value(s) without overwriting the old ones. Admission control block 182 of ER-RX 158 accepts no new reservations from a virtual pool to which an update is to be performed until the amount of reserved resources falls below the new virtual pool capacity. Once the reserved resources fall below the new virtual pool capacity, admission control block 182 of ER-RX 158 overwrites the old virtual pool capacity value(s) with the new value(s), and acknowledges acceptance of the new virtual pool capacity value(s) by sending an ACK 324 to PDP 160*b*.

PDP 160*b* defers installation of new scheduler weight(s) on BR-RX 156 until PDP 160*b* receives ACK 324 from ER-RX 158. In response to ACK 324, PDP 160*b* pushes queue configuration(s) and scheduler weight(s) onto BR-RX 156, as illustrated at reference numeral 326. After successful installation of the new queue configuration(s) and scheduler weight(s), BR-RX 156 returns an ACK 328 to PDP 160*b*.

In an alternative embodiment, PDP 160*b* determines when to perform a virtual pool capacity update instead of ER-RX 158. In this embodiment, PDP 160*b* solicits reports of or programs periodic unsolicited reporting by ER-RX 158 of the currently reserved Intserv bandwidth. If the currently reserved bandwidth is greater than the new capacity specified by the NMS, PDP 160*b* pushes a policy to ER-RX 158 to stop accepting new reservations until the reserved bandwidth is below the new capacity. To further reduce the amount of messaging, PDP 160*b* may push a policy on ER-RX 158 that instructs ER-RX 158 to send a single unsolicited report to PDP 160*b* only after the reserved bandwidth is less than the new capacity. In response to a message from ER-RX 158 indicating that the currently reserved Intserv bandwidth is less than the new virtual pool capacity, PDP 160*b* pushes the new Intserv virtual pool policy onto ER-RX 158 and pushes the corresponding new scheduler queues and weights to BR-RX 156 in the manner described above.

If PDP 160*b* fails to successfully update either ER-RX 158 or BR-RX 156, PDP 160*b* may roll back to the old virtual pool capacities and queue and scheduler weight configuration. Additionally, PDP 160*b* may send warning messages to the network operator to describe the reason of the failure (e.g., "Failure to configure the updated Integrated Services virtual pool capacity on ER XX!" or "Failure to configure the updated scheduler weight on BR XX!").

To prevent a PDP (e.g., PDP server 160*b*) from becoming a single point of failure, a backup PDP may be utilized for one or more primary PDPs. In the event that a primary PDP fails, the Intserv service control may be switched to the backup PDP, and each ER-RX controlled by the primary PDP may report its current reservation state to the backup PDP. However, each ER-RX should stop accepting new reservations until the switch to the backup PDP is completed. After the primary PDP is restored, the backup PDP first synchronizes state with the primary PDP and then informs each ER-RX to switch back to the primary PDP. After switching back to the primary PDP, each ER-RX synchronizes its reservation state with the primary PDP.

In the event of a failed ER or BR, IP routing and RSVP refresh messages are used to discover a new route and reroute flows around the failed ER or BR. Upon successful rerouting, PDP 160*b* may push a policy to the corresponding BR-RX 156 to release the Diffserv queues allocated to Intserv traffic for the failed ER-RX or push policies to all downstream ER-RXs of a failed BR-RX to release the configured virtual pool(s) for the failed BR-RX.

Referring now to FIG. 8C, there is illustrated an exemplary scenario in which an NMS or network service provider operator directly alters the configuration of queue(s) and scheduler weight(s) on BR-RX 156. In response to the update, BR-RX 156 notifies PDP 160*b* of the changes. If not contained in the notification, PDP 160*b* pulls the configuration update from BR-RX 156, as indicated at reference numeral 342, and then, as depicted at reference numeral 344, pushes the new configuration of virtual pool capacities onto all affected ER-RX(s) (of which only ER-RX 158 is shown).

VI. Conclusion

As has been described, the present invention provides a scalable IP network model that provides end-to-end QoS for selected flows by implementing edge-based Intserv over a Diffserv domain. The network model supports a number of functions, including per-flow admission control utilizing Intserv RSVP processing only at the CPE edge routers, receiving edge router identification, upstream admission control at the receiving edge router, pool-based resource management, and synchronization of bandwidth usage information between the receiving boundary router and receiving edge router by policy management. Despite introducing additional functionality, the network model of the present invention is consistent with existing Intserv, COPS and Diffserv models, and the Diffserv policy provisioning model using policy and management information bases. The network model of the present invention advantageously enhances scalability while maintaining a standardized architecture and can therefore be readily adopted for implementation.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. For example, although the present invention has been primarily discussed with respect to implementations employing Resource Reservation Protocol (RSVP) and Internet Protocol (IP), it should be appreciated the present invention has applicability to other communication protocols, including Session Initiation Protocol (SIP) and ITU H.323, which may be used to perform admission control by the selective admission or denial of an enhanced QoS flow based upon policy and available resources. Moreover, although the present invention has been described with respect to various hardware elements that perform various functions in order to achieve end-to-end QoS for selected network flows, it should be understood that such functions can be realized through the execution of program code embodied in a computer-readable medium. The term "computer-readable medium" as used herein refers to any medium that participates in providing instructions to a data processing system for execution. Such a medium may take many forms, including but not limited to non-volatile media, volatile media, and transmission media.

What is claimed is:

1. A method comprising:
receiving, at a boundary router, a request for resource reservation for a flow through the boundary router onto a downstream link;
determining to forward the request toward an upstream router without performing admission control for the downstream link; and
granting the reservation request when sufficient available bandwidth is available in a virtual pool and otherwise denying the reservation request,
wherein the upstream router is a router that receives the flow prior to the boundary router, and
wherein available resources in the virtual pool are reduced by an amount requested by each successful reservation, and the available resources are increased in the virtual pool by an amount of resources freed upon termination of the flow.

2. A method of claim 1, further comprising:
communicating with an edge router configured to generate the request, wherein the edge router is further configured to perform admission control for the downstream link.

3. A method of claim 1, wherein the request is a Resource Reservation Protocol (RSVP) request and the flow is an Integrated Services flow.

4. A method of claim 3, further comprising:
selecting, based on the flow, one of a plurality of different qualities of service corresponding to a plurality of Integrated Services flows.

5. A boundary routing apparatus comprising:
at least one processor; and
at least one memory including computer program code for one or more programs,
the at least one memory and the computer program code configured to, with the at least one processor, cause the apparatus to perform at least the following,
receive, at a boundary router, a request for resource reservation for a flow through the boundary router onto a downstream link,
determine to forward the request toward an upstream router without performing admission control for the downstream link, and
grant the reservation request when sufficient available bandwidth is available in a virtual pool and otherwise deny the reservation request,
wherein the upstream router is a router that receives the flow prior to the boundary router, and
wherein available resources in the virtual pool are reduced by an amount requested by each successful reservation, and the available resources are increased in the virtual pool by an amount of resources freed upon termination of the flow.

6. An apparatus of claim 5, wherein the apparatus is further caused to:
communicate with an edge router configured to generate the request, wherein the edge router is further configured to perform admission control for the downstream link.

7. An apparatus of claim 5, wherein the request is a Resource Reservation Protocol (RSVP) request and the flow is an Integrated Services flow.

8. An apparatus of claim 7, wherein the apparatus is further caused to:
select, based on the flow, one of a plurality of different qualities of service corresponding to a plurality of Integrated Services flows.

9. A method comprising:
receiving a resource reservation message requesting resources for a flow destined for a downstream link;
determining that the message is received at a proper edge router to forward the flow over the downlink;
performing at the edge router admission control for the downstream link and an upstream link associated with the flow based on the determination; and
granting the reservation request when sufficient available bandwidth is available in a virtual pool and otherwise denying the reservation request,
wherein available resources in the virtual pool are reduced by an amount requested by each successful reservation, and the available resources are increased in the virtual pool by an amount of resources freed upon termination of the flow.

10. A method of claim 9, wherein the step of determining includes either,
comparing a destination address for the flow with an address corresponding to a receiving local area network; or
accessing an edge point identification table that specifies one or more ranges of addresses designated for the proper edge router.

11. A method of claim 9, wherein the resource reservation message is generated according to a Resource Reservation Protocol (RSVP), and the flow is an Integrated Services flow.

12. A method of claim 9, further comprising:
determining availability of resources for the downstream link or the upstream link by examining one or more virtual pools that represent resource availability of a plurality of service classes.

13. A method of claim 9, further comprising:
accessing a policy decision point to retrieve policy information specifying identification of the proper edge router.

14. A method of claim 13, wherein the policy decision point further specifies either,
a mapping between a plurality of Differentiated Services classes and a plurality of Integrated Services classes,
an admission control virtual pool table indicating capacities of a plurality of virtual pools corresponding to resources for the downstream link and the upstream link, or
a combination thereof.

15. An apparatus comprising:
at least one processor; and
at least one memory including computer program code for one or more programs,
the at least one memory and the computer program code configured to, with the at least one processor, cause the apparatus to perform at least the following,
receive a resource reservation message requesting resources for a flow destined for a downstream link,
determine that the message is received at a proper edge router to forward the flow over the downlink,
perform at the edge router admission control for the downstream link and an upstream link associated with the flow based on the determination, and
grant the reservation request when sufficient available bandwidth is available in a virtual pool and otherwise deny the reservation request,
wherein available resources in the virtual pool are reduced by an amount requested by each successful reservation, and the available resources are increased in the virtual pool by an amount of resources freed upon termination of the flow.

16. An apparatus of claim 15, wherein the apparatus is further caused to:
compare a destination address for the flow with an address corresponding to a receiving local area network; or
access an edge point identification table that specifies one or more ranges of addresses designated for the proper edge router.

17. An apparatus of claim 15, wherein the resource reservation message is generated according to a Resource Reservation Protocol (RSVP), and the flow is an Integrated Services flow.

18. An apparatus of claim 15, wherein the apparatus is further caused to:
determine availability of resources for the downstream link or the upstream link by examining one or more virtual pools that represent resource availability of a plurality of service classes.

19. An apparatus of claim 15, wherein the apparatus is further caused to:
access a policy decision point to retrieve policy information specifying identification of the proper edge router.

20. An apparatus of claim 19, wherein the policy decision point further specifies either,
a mapping between a plurality of Differentiated Services classes and a plurality of Integrated Services classes,
an admission control virtual pool table indicating capacities of a plurality of virtual pools corresponding to resources for the downstream link and the upstream link, or
a combination thereof.

* * * * *